Nov. 22, 1955 C. GERST 2,724,290
TRANSMISSION AND AXLE MECHANISM
Filed March 19, 1952 4 Sheets-Sheet 2

INVENTOR.
CHRIS GERST
BY
ATT.

Nov. 22, 1955   C. GERST   2,724,290

TRANSMISSION AND AXLE MECHANISM

Filed March 19, 1952   4 Sheets-Sheet 4

INVENTOR.
CHRIS GERST
BY
*Gustav A. Wolff*
ATT.

United States Patent Office 2,724,290
Patented Nov. 22, 1955

2,724,290

TRANSMISSION AND AXLE MECHANISM

Chris Gerst, Detroit, Mich., assignor, by mesne assignments, to Napco Industries Inc., Minneapolis, Minn., a corporation of Indiana Application March 19, 1952, Serial No. 277,480

1 Claim. (Cl. 74—695)

This invention relates in general to reduction transmission mechanism and more particularly to improved, combined axle and transmission mechanism for tractors, heavy duty road machinery, etc. though not limited to any particular application.

The primary object of the invention is the provision of a simple, compact, multi-speed forward and reverse transmission and axle mechanism embodying in a single unit shiftable forward and reverse multi-speed transmission means, split axle means and differential gearing coupling the multi-speed transmission means with the split axle means for differential rotation of its axle sections with respect to each other.

Another object of the invention is the provision of a forward and reverse transmission and axle mechanism of the type referred to above in which forward and reverse rotation of the shiftable, multi-speed transmission is controlled by a forward and reverse planetary type drive arrangement including a continuously rotating drive shaft, a driven shaft sleeved upon said drive shaft in coaxial arrangement with respect thereto, sun and planetary gear means and clutch and brake means controlling actuation of said planetary type drive arrangement for forward and reverse rotation of its driven shaft by the drive shaft.

A further object of the invention is the provision of a forward and reverse transmission and axle mechanism of the type referred to above which has journaled in its housing and extended through opposite walls thereof the drive shaft of the mechanism, which has mounted on such drive shaft elements of the planetary drive arrangement, and which has its one end directly coupled with hydraulic power unit means for its continuous rotation at a high speed when the drive shaft is coupled with and driven by an engine.

Still further objects and novel features of construction, combination and relation of parts by which the objects in view have been attained, will appear and are set forth in detail in the course of the following specification. The drawings accompanying and forming part of the specification illustrate a certain practical embodiment of the invention, but it will be apparent as the specification proceeds that the structure may be modified and changed in various ways without departure from the true spirit and broad scope of the invention.

Figure 1:
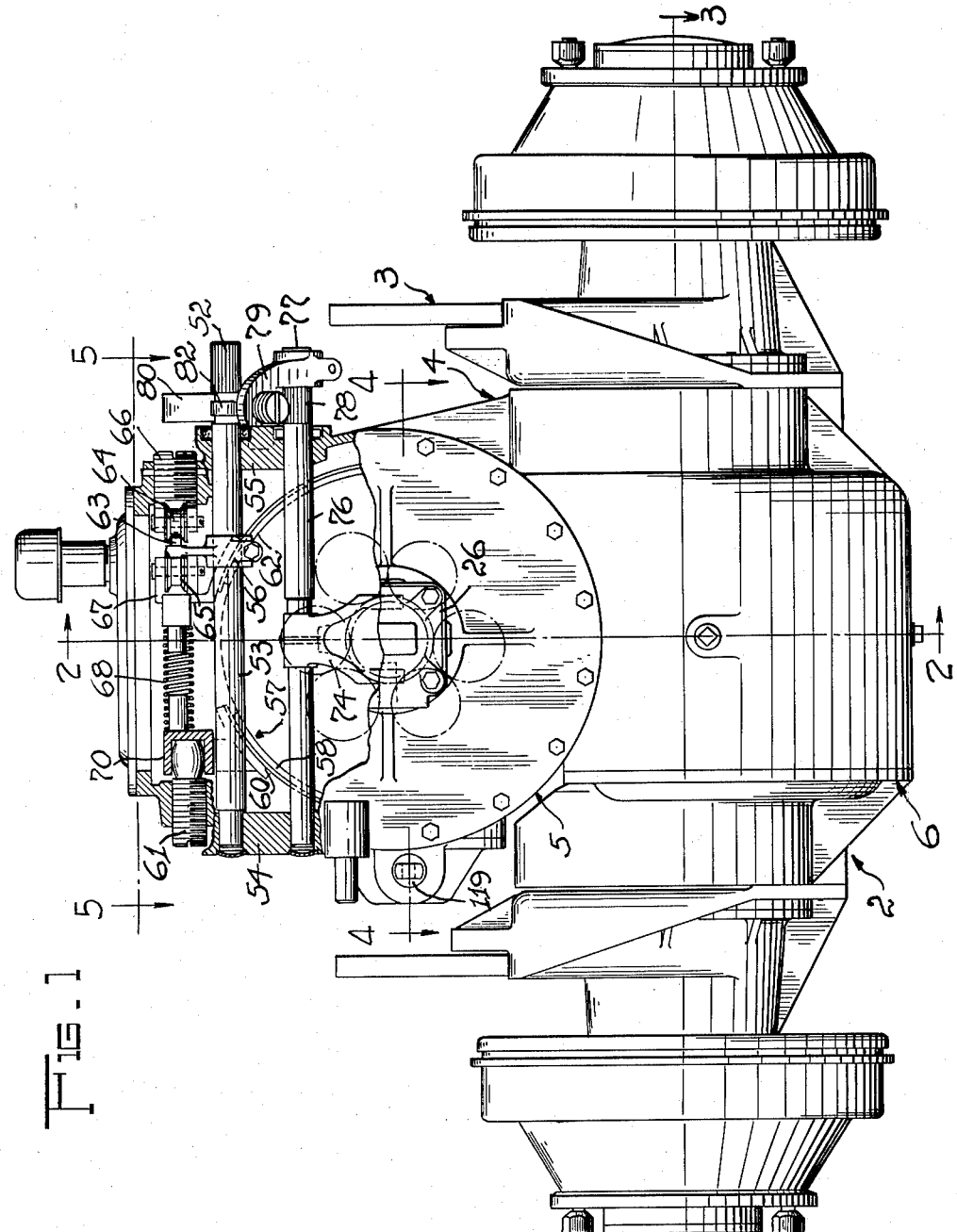
Fig. 1 is a rear view partly in section of a multi-speed forward and reverse transmission and axle mechanism constructed in accordance with the invention, the mechanism being shown attached to the frame structure of a tractor having its driving wheels removed.
Figure 2:
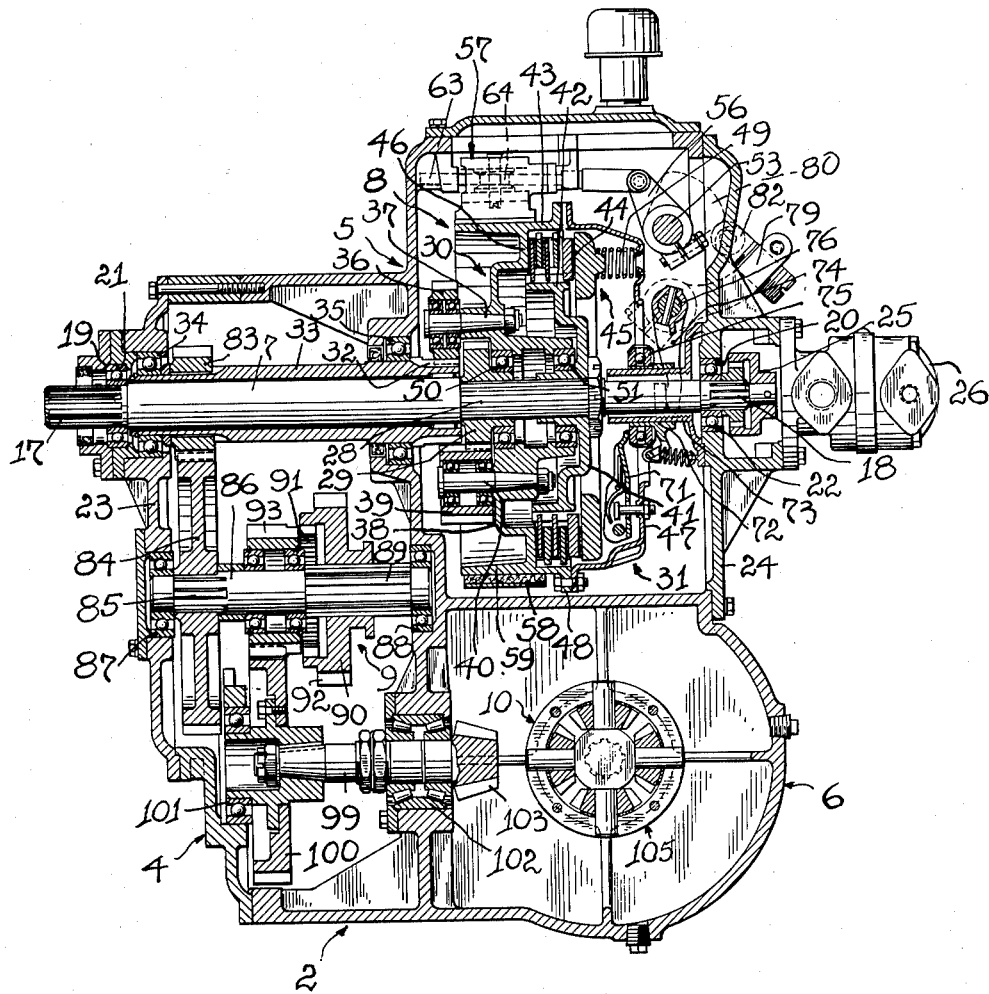
Fig. 2 is a sectional view through the mechanism shown in Fig. 1, the section being taken on line 2—2 of Fig. 1.
Figure 3:
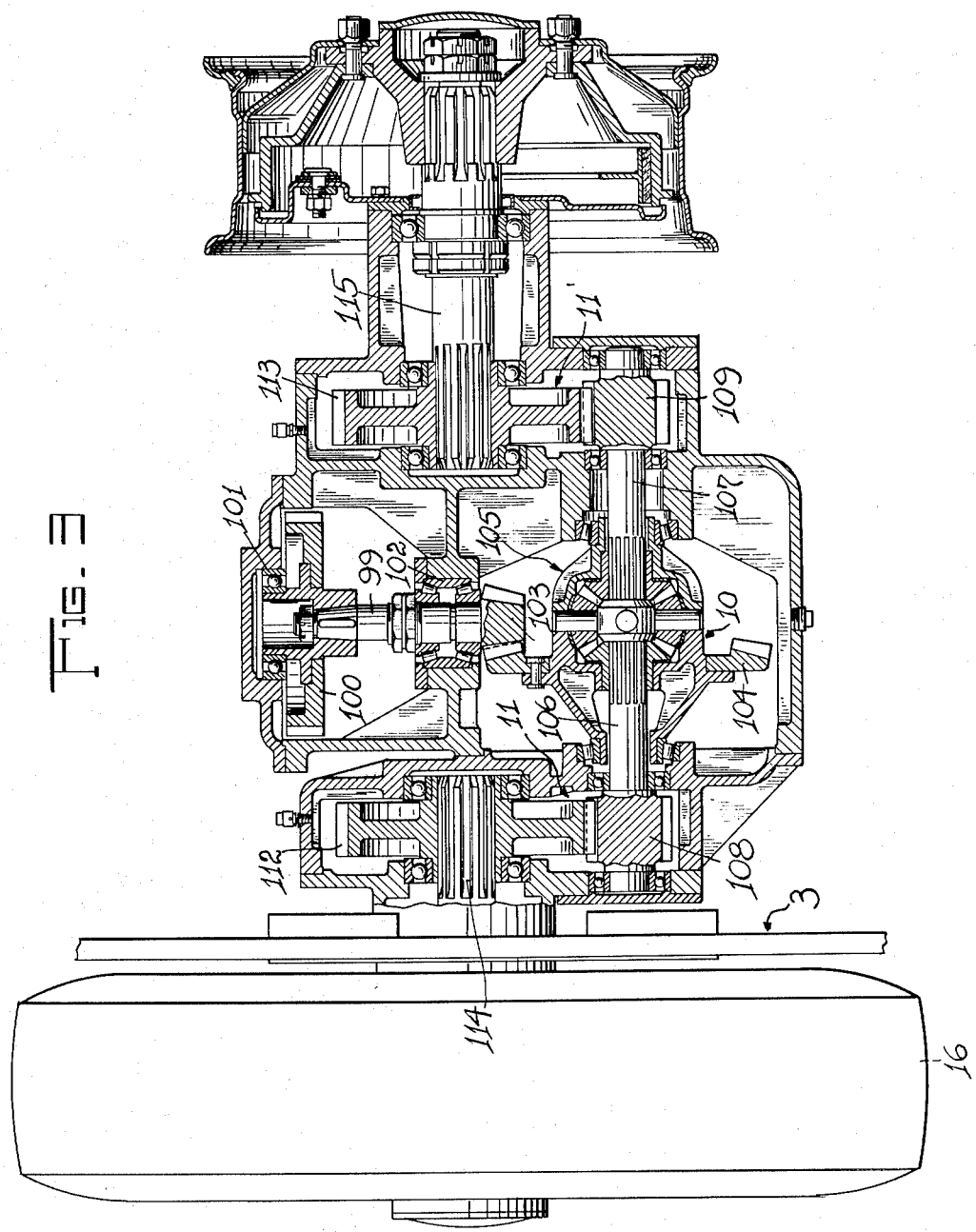
Fig. 3 is a sectional view through the differential and drive gearing connecting the multi-speed transmission with the driving wheels of the tractor, the section being taken on line 3—3 of Fig. 1.
Figure 4:
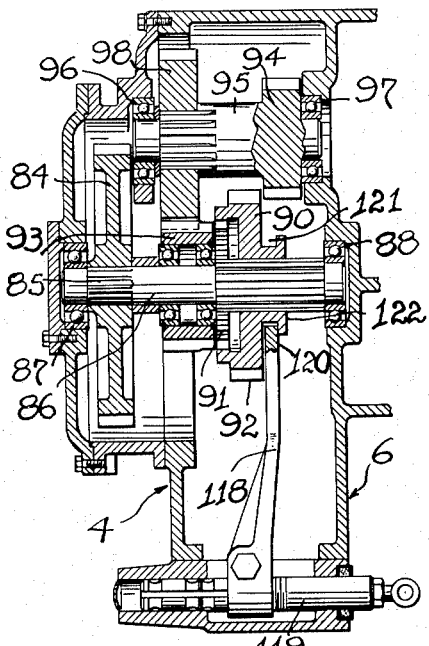
Fig. 4 is a fragmentary sectional view taken on line 4—4 of Fig. 1.
Figure 5:
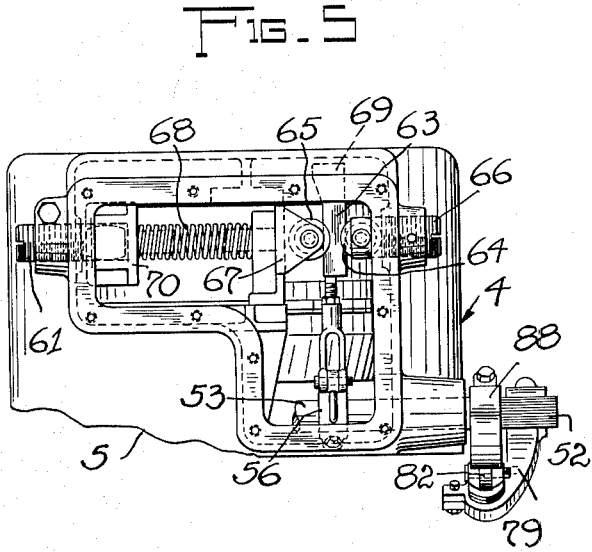
Fig. 5 is a plan view taken on line 5—5 of Fig. 1 with the cover removed to expose the operating mechanism for the brake arrangement of the planetary type transmission.
Figure 6:
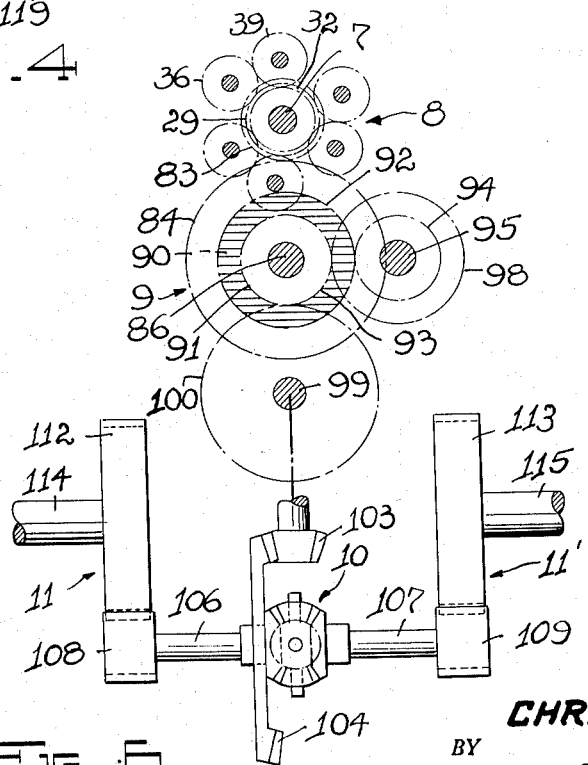
Fig. 6 is a diagrammatic view showing the gear layout of the transmission and axle mechanism.

Referring now more particularly to the exemplified form of the invention shown in the drawings, the multi-speed forward and reverse transmission and axle mechanism 2 which forms the driving means for a tractor frame 3 comprises a housing 4 including a transmission section 5 and a differential and axle section 6. Transmission section 5 mounts a drive shaft 7, a forward and reverse planetary type drive arrangement 8 and a shiftable multi-speed transmission 9, and differential and axle section 6 mounts a differential gearing 10 coupled with and driven by the multi-speed transmission 9 and reduction gearings 11, 11' coupled with the shaft sections 106, 107 of a differential gearing 10 which drives the wheel shafts 114, 115 mounting the driving wheels 16.

Transmission section 5 has journaled therein input shaft 7, the splined front and rear ends 17 and 18 of which extend outside of said section and are rotatably supported in ball bearings 19 and 20 mounted in flanged openings 21, 22 of front and rear walls 23 and 24 of transmission section 5. Input shaft 7 has its rear end 18 coupled by a coupling 25 with a hydraulic power unit 26 supported on rear wall 24 of transmission section 5 and mounts on a central splined portion 28 a drive pinion 29 which is coupled with a forward and reverse planetary type drive arrangement 8 embodying a planetary drive structure 30 and a spring loaded clutch structure 31.

Planetary drive structure 30 includes the drive pinion 29 and a sun gear 32 formed as part of a tubular shaft 33 which encircles input shaft 7 in axial alignment therewith and is mounted in ball bearings 34 and 35. The drive pinion 29 meshes with three planet gears 36 journaled on stud shafts 37 mounted on a freely rotatably supported planet gear carrier 38 and these planet gears mesh with three idler planet gears 39 which are journaled on stud shafts 40 also mounted on planet gear carrier 38. Idler planet gears 39 mesh with drive pinion 29 on input shaft 7 and effect a driving connection of the input shaft with the planetary drive structure 30.

The spring loaded clutch structure 31 embodies a main body portion 41 mounted on central splined portion 28 of input shaft 7 and includes a splined, circumferential flange 42 encircled in radially spaced relation by an internally splined, laterally extended flange 43 on planet gear carrier 38. Flanges 42 and 43 non-rotatably and laterally shiftably support cooperating friction disks arranged to frictionally engage each other when shifted by a spring-pressed, ring-shaped clamping plate member 44 of a clamping plate structure 45 toward the vertical wall portion 46 of planet gear carrier 38. The clamping plate structure 45 embodies a cover member 47 which is secured to the flange 48 of planet gear carrier 38 and mounts in recessed areas pre-loaded springs 49 yieldingly forcing clamping plate member 44 toward the wall portion 46 of the planet gear carrier.

The planetary type drive arrangement 8 in which planet gear carrier 38 of the planetary drive structure 30 is freely rotatably mounted on ball bearings 50 and 51, affords a simple and economic means to effect forward and reverse rotation of tubular shaft 33 and arresting of rotation of such shaft. Thus, when clutch structure 31 is activated by preloaded springs 49 rotation of input shaft 7 is directly transferred to tubular shaft 33 by drive pinion 29, planet gears 36, idler planet gears 39 and sun gear 32, the planet and idler planet gears being interlocked with each other due to coupling of planet gear carrier 38 with the main body portion 41 of clutch structure 31. In this case input shaft 7 and tubular shaft 33 are coupled for direct rotation in the same direction and at the same speed. When clutch structure 31 is inactivated in a manner later to be described rotation of input shaft 7 is transferred by drive pinion 29 through planet gears 36, idler planet gears 39 and sun gear 32 to tubular shaft 33. In this case rotation of tubular shaft 33 is resisted, whereas rotation of planet gear carrier 38 is unimpeded so that planet gears 36 and 39 effect idling of planet gear carrier 38 around tubular shaft 33. When clutch structure 31 is inactivated and planet gear carrier 38 arrested in a manner later to be described, rotation of input shaft 7 is transferred to tubular shaft 33 through planet gears 36, idler planet gears 39 and sun gear 32, so that shaft 33 is rotated in a reverse direction to the direction of rotation of input shaft 7.

Planetary type drive transmission 8 has its planetary drive structure 30 and spring-loaded clutch structure 31 shifted to forward and reverse drive positions by a shifting lever (not shown) coupled with the outwardly extended end portion 52 of a cam shaft 53. This cam shaft is journaled in side walls 54, 55 of transmission section 5 and mounts a crank arm 56 which actuates upon a brake arrangement 57 adapted to stop rotation of planet gear carrier 38. Brake arrangement 57 embodies a brake band 58 encircling the peripheral flange 59 of planet gear carrier 38, which brake band has one end 60 adjustably secured to transmission section 5—a screw member 61 engaged with said end and threadedly connected with section 5 being used for this purpose—and which engages with its other end 62 a shiftable cam member 63 hinged to crank arm 56 on cam shaft 53 for reciprocatory movement with respect to the end 62 of brake band 58 when said cam shaft is rocked in opposite directions by a shifting lever such as referred to above. Shiftable cam member 63 is guided between two oppositely arranged grooved rollers 64 and 65, roller 64 of which is adjustably secured in transmission section 5 by a screw member 66, and roller 65 of which is mounted on a bracket 67 at the end 62 of brake band 58, which bracket by a compression spring 68 is yieldingly shifted toward shiftable cam member 63 to contact roller 65 by said cam member. Shiftable cam member 63 includes at one end a cam-shaped extension 69 adapted to effect shifting of bracket 67 against the force of compression spring 68 toward bracket 70 at the end 60 of brake band 58 so as to tightly grip the peripheral flange 59 of planet gear carrier 38 and arrest its rotation.

Inactivation of spring-loaded clutch structure 31 is effected when spring-pressed clamping plate member 44 is shifted against the force of springs 49 toward cover member 47 by a lever 71 pivoted to such cover member. Such shifting of the clamping plate member 44 is effected by a collar 72 slidably mounted on a tubular flanged member 73 which is secured to the rear wall 24 of transmission section 5 and has the rear portion of input shaft 7 extended therethrough. Collar 72 is engaged by the fork-shaped end of a lever arm 74, a thrust bearing 75 being used for this purpose to permit shifting of the clamping plate member 44 into inoperative position and therewith inactivation of clutch structure 31. Lever arm 74 is mounted on a pivot shaft 76 which is journaled in side walls 54, 55 of transmission section 5. This pivot shaft is extended with one end 77 outside of said transmission section and supports on the exposed end portion 78 a lever arm 79 which cooperates with a cam 80 on outwardly extended end portion 52 of cam shaft 53 by a roller member 82 adjustably mounted on said lever arm 79 to effect timed operation of brake band 58 with respect to the inactivation of spring-loaded clutch structure 31.

The thus constructed planetary type drive arrangement 8 is coupled by a drive pinion 83 on tubular shaft 33 with a large spur gear 84 of shiftable, multi-speed transmission 9. Spur gear 84 is mounted on the splined end portion 85 of shaft 86 which is journaled in ball bearings 87, 88 arranged in differential and axle section 6 of housing 4. Shaft 86, furthermore, slidably and non-rotatably supports on a splined end portion 89 a double gear 90 which includes an internal clutch portion 91 and an external gear portion 92. This double gear 90 is arranged to be shifted to mesh its internal clutch portion 91 with an idler gear 93 which is freely rotatably supported on shaft 86 or to mesh external gear portion 92 with a gear 94 mounted on countershaft 95 which is journaled in ball bearings 96, 97 in differential and axle section 6. Countershaft 95 also mounts a gear 98 which is aligned with idler gear 93 and continuously engaged therewith to transfer rotation of shaft 86 directly or indirectly to a second countershaft 99 mounting a large gear 100 which meshes with idler gear 93. This latter countershaft is journaled in bearings 101 and 102 and carries at one end a drive pinion 103 meshing with a bevel gear 104 of differential gear 105 including shaft sections 106 and 107 having at their outer end portions gear pinions 108, 109 which mesh with large gears 112, 113 on wheel shafts 114, 115 mounting the customary driving wheels 16.

In operation the multi-speed forward and reverse transmission and axle mechanism—when coupled with the engine of a device to be driven—is actuated by rocking cam shaft 53 to the desired position for rotation of tubular shaft 33 in either a forward or reverse direction, which tubular shaft by its drive pinion 83 meshing with spur gear 84 effects rotation of shaft 86. Rotation of this latter shaft is transferred through idler gear 93 to shaft 99 by gear 100; double gear 90 on shaft 86 being either directly coupled with idler gear 93 or with a gear 94 on a countershaft 95 which mounts gear 98 also meshing idler gear 93. Shaft 99 transfers its rotation by drive pinion 103 to bevel gear 104 of differential gear 105 which by reduction gearings 11, 11' transfers such rotation to the wheel shafts 114 and 115. Transmission of power by the described multi-speed forward and reverse transmission and axle mechanism is controlled by both the planetary type drive arrangement 8 or the shiftable multi-speed transmission 9. Thus, when cam shaft 53 is shifted to a neutral position both clutch structure 31 and brake arrangement 57 are inactivated, and idling rotation of planet gear carrier 38 around tubular shaft 33 is unimpeded; and when shiftable gear 90 is shifted to a neutral position this gear 90 is not coupled with idler gear 93 or gear 94 on countershaft 95. Shifting of gear 90 is effected by a shifting fork 118 which is mounted on a shifting rod 119 which has its forked end 120 engaged with a groove 121 in hub portion 122 of gear 90.

Having thus described my invention, what I claim is:

A tractor transmission mechanism comprising, a housing, a driving shaft journalled in and extending through opposed walls of said housing and having splined opposite power input and output ends projecting outwardly beyond said walls, a power take off unit coupled to said splined power output end of said driving shaft, a tubular driven shaft rotatably embracing said driving shaft within said housing and having a sun gear at one end and a pinion secured to its opposite end, a forward and reverse gearing unit including planetary gears meshing with said sun gear and shiftable clutch mechanism non-rotatably suspended from said driving shaft between said planetary gears and said power take off unit, a countershaft journalled in said housing parallel to said driving shaft and having thereon a gear meshing with said pinion, a pair of alined wheel driving axles journalled in said housing at right angles to said shafts, differential gearing carried by said housing, means including said pinion, countershaft and countershaft gear drivingly connecting said gearing unit with said differential gearing, and speed reduction gearing, connecting said differential gearing with said axles.

References Cited in the file of this patent

UNITED STATES PATENTS

| | | |
|---|---|---|
| 1,652,358 | Heider | Dec. 13, 1927 |
| 1,759,472 | Tuttle | May 20, 1930 |
| 1,903,914 | Parrett | Apr. 18, 1933 |
| 2,090,123 | Hoffman | Aug. 17, 1937 |
| 2,093,236 | Dodge et al. | Sept. 14, 1937 |
| 2,277,517 | Jaeger et al. | Mar. 24, 1942 |
| 2,303,738 | Harrison | Dec. 1, 1942 |
| 2,447,136 | Putz | Aug. 17, 1948 |
| 2,448,345 | Aronson | Aug. 31, 1948 |

FOREIGN PATENTS

| | | |
|---|---|---|
| 8,537 | Great Britain | Apr. 16, 1908 |